(12) United States Patent
Suzuki et al.

(10) Patent No.: US 7,382,093 B2
(45) Date of Patent: Jun. 3, 2008

(54) DEVICE FOR OPERATION OF A DISCHARGE LAMP OF THE SHORT ARC TYPE

(75) Inventors: Yoshikazu Suzuki, Himeji (JP); Tomoyoshi Arimoto, Himeji (JP); Katsumi Sugaja, Himeji (JP)

(73) Assignee: Ushiodenki Kabushiki Kaisha, Tokyo (JP)

( * ) Notice: Subject to any disclaimer, the term of this patent is extended or adjusted under 35 U.S.C. 154(b) by 431 days.

(21) Appl. No.: 11/281,387

(22) Filed: Nov. 18, 2005

(65) Prior Publication Data

US 2006/0108949 A1 May 25, 2006

(30) Foreign Application Priority Data

Nov. 19, 2004 (JP) .............................. 2004-336328

(51) Int. Cl.
*H01J 17/20* (2006.01)
*H05B 37/00* (2006.01)

(52) U.S. Cl. ................... 313/576; 313/574; 313/623; 313/624; 313/600; 315/224; 315/225; 315/291; 315/307

(58) Field of Classification Search ............... 313/576, 313/574, 600, 605, 623, 24; 315/224, 225, 315/291, 307, 209 R
See application file for complete search history.

(56) References Cited

U.S. PATENT DOCUMENTS 5,109,181 A 4/1992 Fischer et al.
5,497,049 A 3/1996 Fischer
6,271,628 B1 8/2001 Sugitani et al.
6,294,879 B1 9/2001 Nagase et al.
2002/0135324 A1 9/2002 Fujii et al.
2004/0150343 A1* 8/2004 Takahashi et al. .......... 313/623
2004/0160189 A1* 8/2004 Fukushima ................. 313/636

FOREIGN PATENT DOCUMENTS

EP 1 408 723 A2 4/2004
EP 1 494 264 A2 1/2005

* cited by examiner

Primary Examiner—Tuyet Vo
(74) Attorney, Agent, or Firm—David S. Safran

(57) ABSTRACT

A device for operating a discharge lamp of the short arc type having a feed device which supplies a direct current to the discharge lamp when operation starts and an alternating current afterwards, in which the feed device supplies a direct current which is smaller than the rated current to the discharge lamp at the start of operation, and a direct current which is at least as large as the rated current, afterwards. A control which ascertains whether the discharge lamp at the start of operation is in a hot or cold start operating state, and which establishes one of the following parameters based on whether the hot or cold operating state ascertained to exist:
the value of the direct current which is at least as great as the rated current;
the feed duration of the direct current which is at least as great as the rated current.

20 Claims, 7 Drawing Sheets

DEVICE FOR OPERATION OF A DISCHARGE LAMP OF THE SHORT ARC TYPE

BACKGROUND OF THE INVENTION

1. Field of the Invention

The invention relates to a device for operation of a discharge lamp of the short arc type. The invention relates especially to a device for operation of a discharge lamp of the short arc type which is used for a rear projector device using an LCD device or a DLP (digital light processor) using a DMD (digital mirror device).

2. Description of the Prior Art

In a projection type projector device, there is a demand for illumination of images onto a rectangular screen in a uniform manner and with sufficient color rendering. Therefore, a discharge lamp with a high mercury vapor pressure, for example, with 150 atm, is used as the light source. Here, by increasing the mercury vapor pressure, broadening of the arc is suppressed (the arc is contracted) and an increase of the light intensity as strong as possible is attempted. This type of discharge lamp is disclosed, for example, in Japanese patent disclosure document JP-A-2-148561 and corresponding U.S. Pat. No. 5,109,181, Japanese patent disclosure document JP-A-6-52830 and corresponding U.S. Pat. No. 5,497,049 and Japanese patent JP-B-2980882 and corresponding U.S. Pat. No. 6,271,628 B1.

In the above described discharge lamp, for example, in a silica glass arc tube containing at least 0.15 mg/mm$^3$ of mercury, a rare gas and from $1\times10^{-6}$ µmole/mm$^3$ to $1\times10^{-2}$ mole/mm$^3$ of a halogen, there is a pair of opposed electrodes at a distance from one another of at most 2 mm. The main purpose of adding the halogen is to prevent devitrification of the arc tube. However, this also yields occurrence of the so-called halogen cycle.

In a discharge lamp of the short arc type (hereinafter also called only a "discharge lamp"), over the course of operation, the tungsten of which the electrodes are made is transported to the inner side of the discharge vessel and is deposited on it (so-called blackening of the tube wall). This blackening of the tube wall causes a reduction of light intensity, and in a drastic case, can adversely affect the service life of the lamp, such as by damaging the discharge vessel.

On the other hand, a projection type projector device, to date, has been used mainly commercially or for similar purposes as a data projector. The time interval from the end of use of the projector device to the next start of use was at least one minute. This means that there was also at least 1 minute after turning off the discharge lamp until the next operation. With this time interval, the electrode temperature of the discharge lamp can be adequately reduced, by which damage to the electrodes upon restart (at the next operation) is also kept low.

In the course of improving projector technology, however, recently, instead of data projectors, so-called rear projection televisions have appeared which are used like televisions. Their use together with plasma screen televisions and large liquid crystal display televisions is generally expected to be common for home use. In these rear projection televisions, the time interval from the end of the use of the projector device to the next use is shorter than in a data projector. Specifically, there is a demand for an extremely short time within 30 seconds.

SUMMARY OF THE INVENTION

A primary object of the present invention is to devise a device for operation of a discharge lamp of the short arc type which will yield a long service life and in which blackening of the tube wall is suppressed. A more specific object of the invention is especially to devise a device for operation of a discharge lamp of the short arc type which has a small time restarting interval and which can also be advantageously used for a rear projection television.

A device for operation of a discharge lamp of the short arc type in accordance with a first aspect of the invention comprises the following:

a discharge lamp of the short arc type in which, in a silica glass arc tube, containing at least 0.15 mg/mm$^3$ mercury, a rare gas and from $1\times10^{-6}$ µmole/mm$^3$ to $1\times10^{-1}$ µmole/mm$^3$ of a halogen, and a pair of opposed electrodes at a distance from each other of at most 2 mm; and a feed device which supplies a direct current to the discharge lamp when operation starts and then supplies an alternating current, at least one of the electrodes having a coil part which was obtained by winding a coil around the electrode, and a melt part which is formed by melting the front end portion of the coil, the coil part adjoining the melt part, the above described object is achieved in that the feed device supplies a direct current which is smaller than the rated current to the discharge lamp at the start of operation, and then supplies a direct current which is at least as large as the rated current, and there is a means which ascertains whether the discharge lamp, at the start of operation, is in a hot start or a cold start operating state, and which establishes at least one of the following parameters according to the ascertained operating state:

a value of the direct current which is at least as great as the rated current;

the feed duration of this direct current.

The object is, furthermore, achieved in that the determination of the operating state of the discharge lamp takes place by the above described feed device. i.e., the determination whether there is a hot or a cold start of the discharge lamp during the interval during which the feed device is supplying the direct current which is at least as great as the rated current.

The object is, moreover, achieved in that the above described starting current, in the case of a cold start of the above described discharge lamp, is 0.3 times to 0.6 times the rated current and that the above described subsequently increased current is 1.0 times to 2.0 times the rated current.

The object is also achieved in that the tips of the above described electrodes are each provided with a projection.

ACTION OF THE INVENTION

In accordance with the invention, in a short-arc discharge lamp of the alternating current operating type with an electrode arrangement having a melt part with a larger diameter and a coil part, a direct current which is smaller than the rated current is allowed to flow at the start of operation, and afterwards, an increased direct current is allowed to flow which is at least as large as the rated current. This measure can suppress blackening of the discharge vessel.

Furthermore, by determining whether the discharge lamp at the start of operation is performing a hot or a cold start, and by regulating the current value and/or the duration of supply of the increased direct current based on this determination result, a discharge lamp can be devised which is also suited for rear projection with a short restarting time interval.

The invention is further described below with reference to the accompanying drawings.

DETAILED DESCRIPTION

Figure 1:
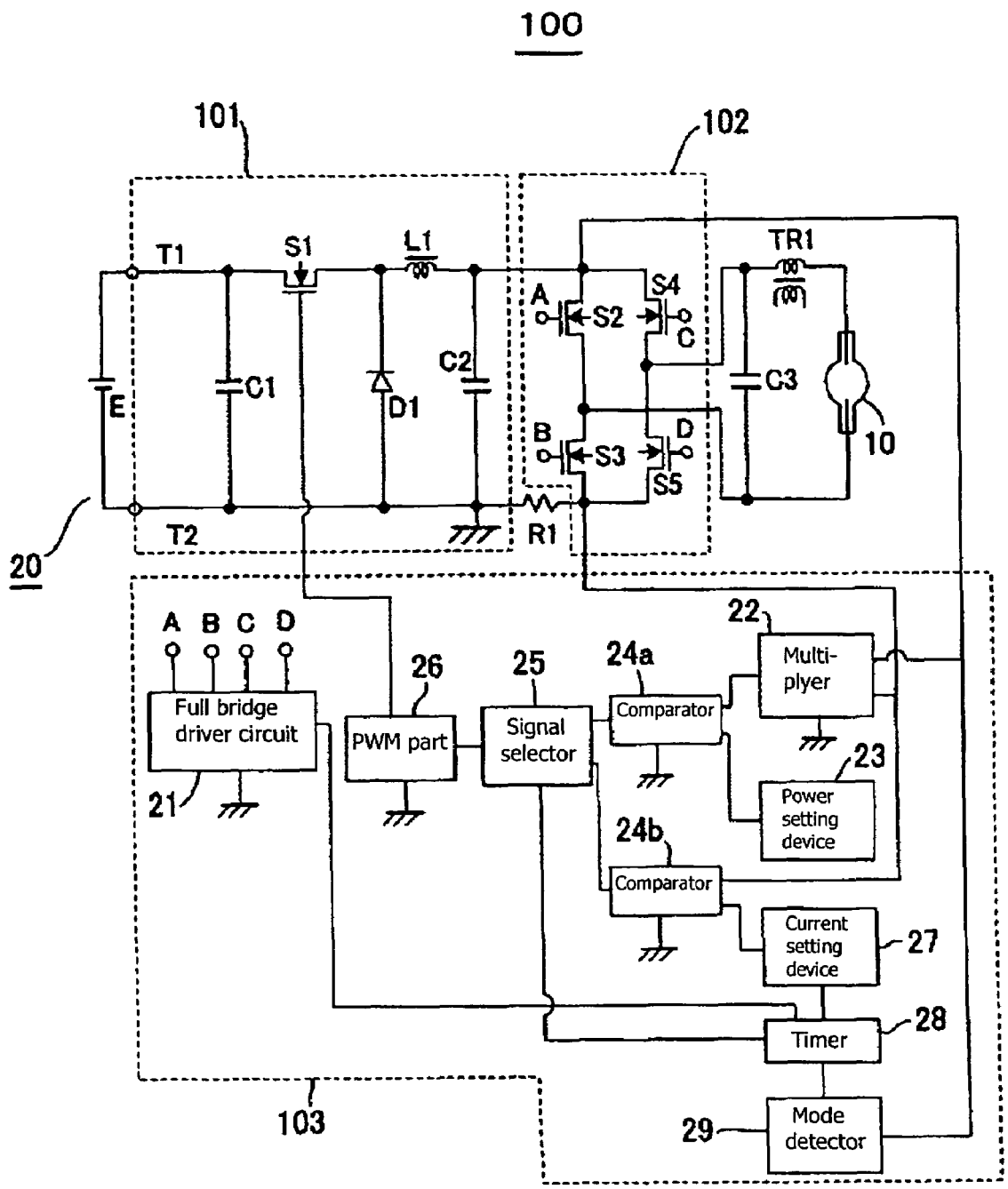
FIG. 1 is a circuit diagram of a device in accordance with the invention for operation of a discharge lamp.

FIG. 1 is a schematic of the arrangement of a device according to the invention for operation of a discharge lamp of the short arc type. An operation device 100 comprised of a discharge lamp 10 and a feed device 20. The feed device 20 comprises a switching part 101, a full bridge part 102, and a control element 103.

A transformer TR1 for an ignitor is series-connected to the discharge lamp 10. Furthermore, a capacitor C3 is connected in parallel to the series connection of the discharge lamp 10 and the transformer TR1. The feed device 20 supplies the discharge lamp 10 with a direct current during starting and with an alternating current in steady-state operation.

The switching part 101 is connected to a direct current source E via the terminals T1, T2 and comprises a capacitor C1, a switching device S1, a diode D1, an inductance L1 and a smoothing capacitor C2. The switching device S1 is subjected to ON-OFF control by a control element 103 and regulates the current and the wattage (discharge wattage) which is supplied to the discharge lamp 10.

The full bridge part 102 comprises switching devices S2 to S5 which are formed of transistors or FETs connected in the manner of a bridge, and of diodes which are connected anti-parallel to the switching devices S2 to S5. Specifically, if the switching devices S2 to S5 are FETs, there is a case in which the full bridge part 102 is formed using parasitic diodes of the FETs.

The switching devices S2 to S5 are each driven by a full bridge driver circuit 21 which is located in the control element 103 and supply an alternating current with rectangular waves to the discharge lamp 10. Specifically, the switching devices S2 and S5, S3 and S4 are each turned on in pairs in alternation. The current flows in the discharge lamp 10 as follows:

When the switching devices S2 and S5 are ON, the current flows in the path: switching part 101→switching device S2→discharge lamp 10→transformer TR1→switching device S5→switching part 101. When the switching devices S3 and S4 are ON, the current flows in the path: switching part 101→switching device S4→transformer TR1→discharge lamp 10→switching device S3→switching part 101.

Furthermore, between the switching part 101 and the full bridge part 102, there is a current determination resistor R1 for determining the current flowing in the discharge lamp 10. The resistor R1 can also be contained in the switching part 101 or in the full bridge part 102.

The control element 103 comprises a full bridge driver circuit 21, a multiplying device 22, a wattage setting device 23, a comparator 24a, a comparator 24b, a signal selector 25, a PWM (pulse width modulation) part 26, a current setting device 27, a timer 28 and a state determination device 29.

In the discharge lamp, during steady state operation, so-called constant wattage control is carried out in which the operating wattage is kept constant. However, when operation starts, so-called constant current control is carried out in which the operating current is kept constant.

In constant wattage control, a current signal is input through the resistor R1, a voltage signal is input through the smoothing capacitor C2 to the multiplying device 22 and a wattage signal is computed which is input to one of the input terminals of the comparator 24a. A wattage reference signal from the wattage setting device 23 is input to the other input terminal of the comparator 24a. The comparator 24a outputs a command signal by a comparison of two input signals to the PWM part 26, such that the wattage is maintained at the reference value. The PWM part 26 subjects the switching device S1 to duty control such that the signal which has been input by the comparator 24a is 0.

The constant current control is carried out by a current signal being input through the resistor R1 and a current reference signal of the current setting device 27 being input to the comparator 24b, which by comparison of two input signals outputs a command signal to the PWM part 26 such that the current signal is brought into agreement with the reference signal. The PWM part 26 subjects the switching device S1 to duty control such that the signal which has been input by the comparator 24b is 0, as in constant wattage control.

In doing so, the signal selector 25 chooses which comparator of the comparators 24a, 24b should operate. Specifically, when operation starts the signal selector 25 chooses the comparator 24b, and in steady-state operation, chooses the comparator 24a, by which different use between constant current control and constant wattage control takes place. For this different use, a method is proposed in which automatic switchover takes place, for example, using a timer.

Switching over from constant current control to constant wattage control is not limited to switching over by the above described signal selector 25, but, for example, constant wattage control can also be carried out in which the uppermost boundary value of the current has been set. In this case, constant wattage control takes place from the starting point on. However, since the uppermost boundary value of the current has been set, at the start of operation and with a simultaneous low lamp voltage, control is carried out while remaining at the uppermost boundary value, i.e., substantial constant current control is carried out, and according to the increase of the lamp voltage, constant wattage control is carried out.

Figure 2:
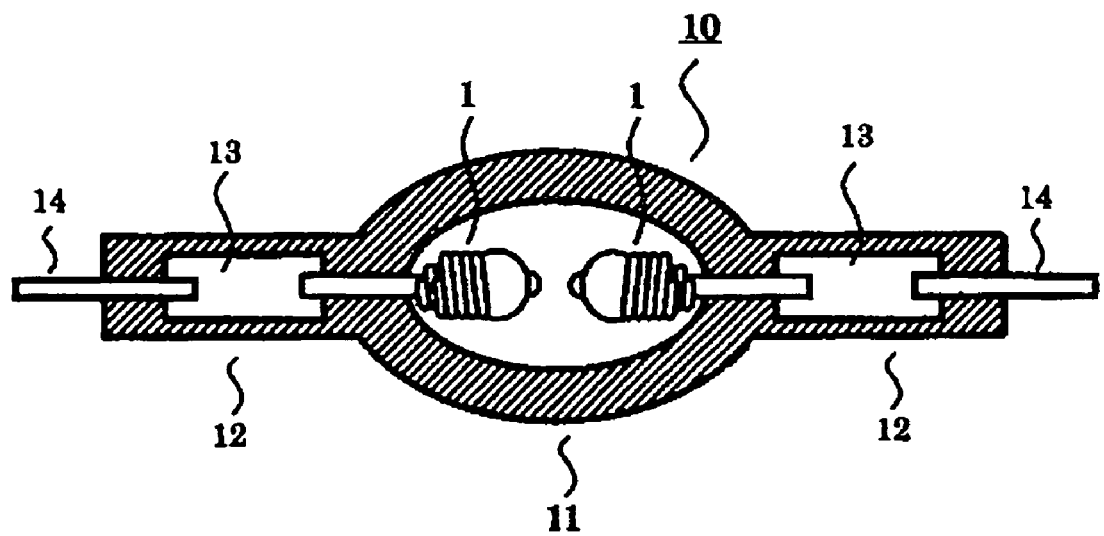
FIG. 2 is a schematic cross-sectional view of a discharge lamp in accordance with the invention.

FIG. 2 shows the overall arrangement of a discharge lamp according to the invention. The discharge lamp 10 has an essentially spherical or ovoid shaped light emitting part 11 which is formed by a silica glass discharge vessel. In this light emitting part 11, there is a pair of opposed electrodes 1. The two ends of the light emitting part 11 are formed in such a way that hermetically sealed portions 12 extend from them. A molybdenum conductive metal foil 13 is hermetically installed in these hermetically sealed portions 12, for example, by a shrink seal. For each of the electrodes 1, a respective electrode rod is welded and electrically connected to one of the metal foils 13. Furthermore, an outer lead 14 is connected to the other end of each metal foil 13.

The light emitting part 11 is filled with mercury, a rare gas and a halogen gas. The mercury is used to obtain the required wavelength of visible radiation, for example, to obtain radiant light with wavelengths from 360 nm to 780 nm, and is added in an amount of at least 0.15 mg/mm$^3$. At this added amount, differently depending on the temperature condition, at least 150 atm, therefore an extremely high vapor pressure is reached during operation. By adding a larger amount of mercury, a discharge lamp with a high mercury vapor pressure during operation of at least 200 atm or 300 atm can be produced. The higher the mercury vapor pressure, the more suitable the light source for a projector device which can be implemented.

For example, roughly 13 kPa of argon gas are added as the rare gas in order to improve the starting property.

Iodine, bromine, chlorine and the like are added as the halogen in the form of a compound with mercury or another metal. The added amount of the halogen is in the range of from $10^{-6}$ μmole/mm$^3$ to $10^{-2}$ μmole/mm$^3$. Its function is also to prolong the service life using the halogen cycle. For an extremely small discharge lamp with an extremely high internal pressure, such as the discharge lamp according to the invention, the main purpose of adding the halogen is to prevent devitrification of the discharge vessel.

This discharge lamp is installed in a projector device which is very small. On the one hand, the overall dimensions of the device are reduced while, on the other hand, there is a demand for a large amount of light. The thermal effect in the light emitting part therefore becomes extremely severe. The value of the wall load of the lamp is 0.8 W/mm$^2$ to 2.0 W/mm$^2$, specifically 1.3 W/mm$^2$.

That the lamp has such a high mercury vapor pressure and such a high value of the wall load leads to its being able to offer radiant light with good color rendering, when it is installed in a projector device for a presentation or in a projector device for a television.

Figure 3:
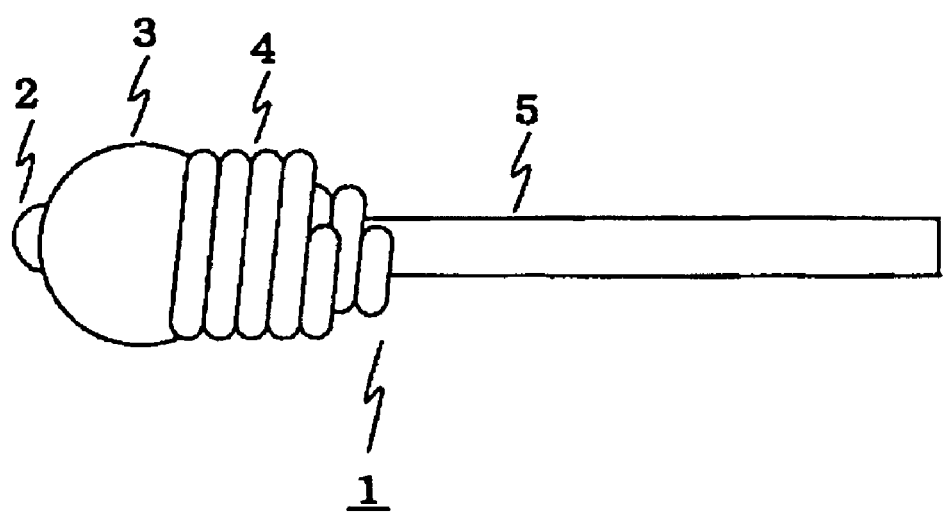
FIG. 3 is a schematic side view of the arrangement of the electrode of a discharge lamp according to the invention.

FIG. 3 shows the electrode 1 in an enlargement. The electrode 1 comprises a projection 2, a melt part with a larger diameter 3, a coil part 4 and a rod 5. The projection 2 is formed on the tip of the melt part with a larger diameter 3. There are cases in which this projection 2 forms and grows naturally over the course of operation of the discharge lamp, and cases in which it is formed beforehand using the tip of the rod 5. In the former case, the projection is formed based on the amount of added halogen and the electrode temperature. It is designed to control the distance between the electrodes in a self-regulating manner.

The melt part with a larger diameter 3 is formed in that, for example, filament-like tungsten is melted in the state in which it is wound helically around the rod 5. By melting the coil it becomes mass-like, by which the thermal capacity can be increased. In particular, in the lamp according to the invention, the presence of a melt part 3 plays an important role since the thermal conditions in the light emitting part 11 are extremely strict.

The coil part 4 is formed in that, proceeding from the above described state in which tungsten is wound helically, the forward part melts and becomes the more massive part 3 and that the remaining back end is coil-shaped. When operation starts the coil part 4 acts as the starting material (starting position) due to the asperities effect of the surface, and moreover, has a heat radiation function after operation due to the asperities of the surface and the heat capacity.

Figure 4A:
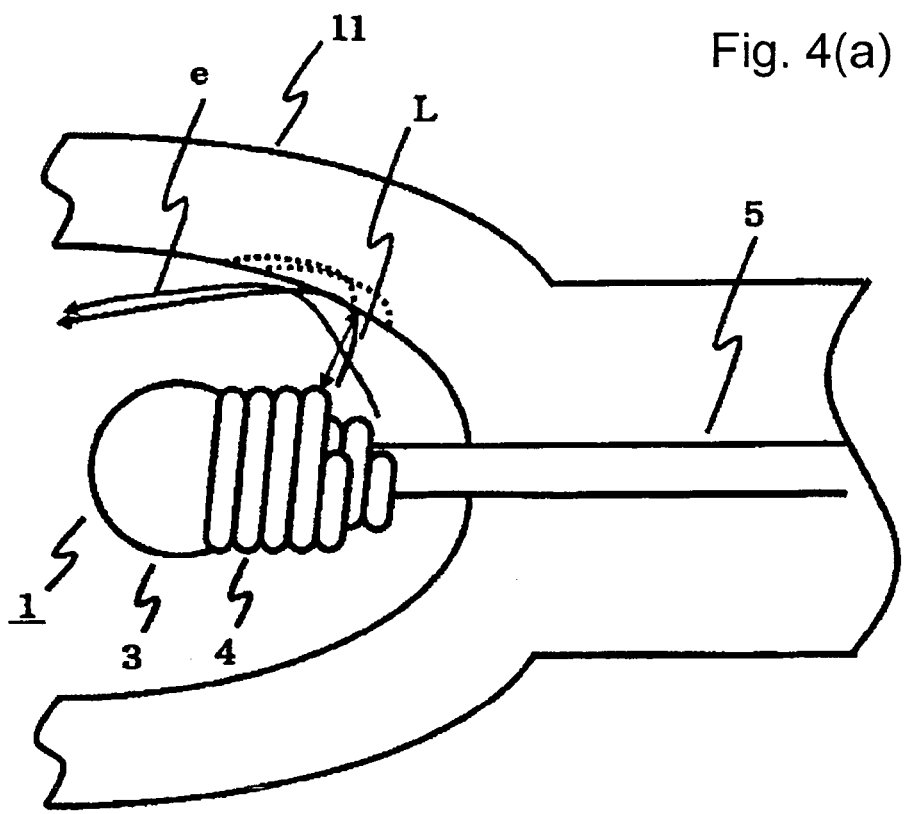
FIGS. 4(a) & 4(b) each show an enlarged schematic of the arrangement of the electrode in the arc tube of a discharge lamp of the invention.
Figure 4B:
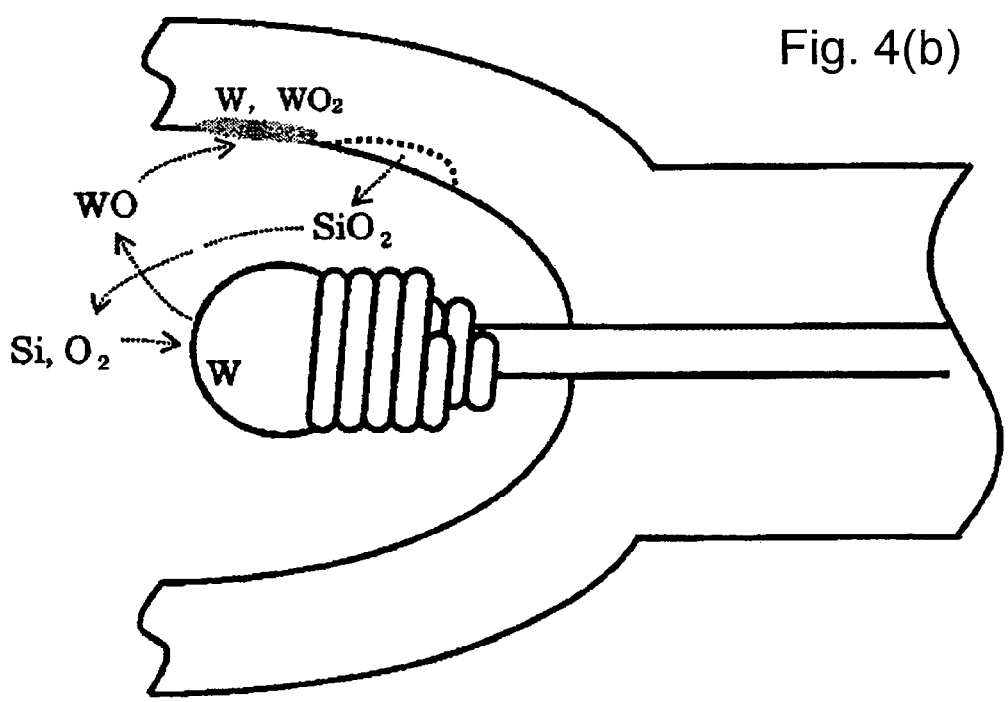

FIGS. 4(*a*) & 4(*b*) each show the arrangement in the vicinity of the base point of the electrode in an enlargement. FIGS. 4(*a*) & 4(*b*) show the same arrangement, FIG. 4(*a*) having reference numbers in order to represent the material components and FIG. 4(*b*) having element symbols in order to represent a physical phenomenon in the light emitting part.

Since the discharge lamp, as was described above, is operated under strict temperature conditions, a heat radiation measure is needed in which the electrodes acquire a heat capacity. The electrodes must therefore have a certain size (volume) as dictated by necessity. This means that a situation arises in which, in contrast to the reduction in the size of the discharge lamp, the electrode volume is increased.

The distance L between the coil part 4 of the electrode 1 and the wall (inside surface) of the discharge vessel (light emitting part 11) is therefore extremely small, as shown in FIG. 4(*a*). The numerical value is, for example, at most 2.0 mm. Specifically, there are also lamps with a distance of at most 1.5 mm or 1.0 mm. The distance defined here is to be understood as the shortest distance between the coil part and the wall of the discharge vessel.

This shortening of the distance between the electrodes and the inside of the discharge vessel results in that the discharge arc comes into contact with the inside of the discharge vessel when at the beginning of start-up a discharge arc forms proceeding from the back end of the coil.

This numerical value differs theoretically depending on the construction specification of the discharge lamp. Therefore, it does not actually make sense to define it as an absolute value. However, since the size of the projector device and the efficiency required by the light source are technically fixed at a certain amount, with consideration of this item, essentially the above described numerical value is obtained.

It can be imagined that the physical phenomenon shown in FIGS. 4(*a*) & 4(*b*) occurs as follows.

If an arc e is formed from the back end of the coil 4, as shown in the drawings, it comes into contact with the inside of the lamp bulb or it collides with it; this causes local deformation of the inside of the discharge vessel and leads to vaporization of the silica glass (SiO$_2$) of which the discharge vessel is made. The vaporized SiO$_2$ splits into Si and O in the discharge plasma and causes tungsten oxide WO to vaporize proceeding from the electrode tip. When this tungsten oxide travels by convection to the vicinity of the inside of the discharge vessel which has a relatively low temperature, it remains partially as a halogen compound such as WO$_2$Br$_2$ or the like within the gas, while another part settles as tungsten or tungsten oxide, WO$_2$ or the like, on the inside of the discharge vessel; this leads to blackening of the tube wall.

This phenomenon occurs distinctly in an arrangement in which the coil and the inside of the discharge vessel closely approached one another. If, at the beginning of start-up, the direct current which is supplied to the discharge lamp is reduced, the effect by contact of the discharge arc which occurs from the back end of the coil with the inside of the discharge vessel is small. Furthermore, the arc start point of the discharge can be guided to the tip.

According to the invention, based on this knowledge, by the arrangement in which the direct current is made smaller than the rated current during starting of operation, it has therefore been found that the disadvantage of blackening of the tube wall of the discharge vessel can thus be prevented.

Here, the lamp according to the invention is a discharge lamp of the alternating current operation type. However, it is operated during the start of operation using a direct current in order to stabilize the discharge when operation starts. Specifically, this is because, in the glow discharge state at the start of the beginning of operation and in the initial stage of the arc discharge with a still inadequately increased electrode temperature, a so-called re-ignition voltage is formed when the polarity of the current flowing in the discharge lamp is inverted, and that, as a result, extinction of the discharge lamp occurs, or if no extinction occurs, a very unstable flicker occurs.

Figure 5:
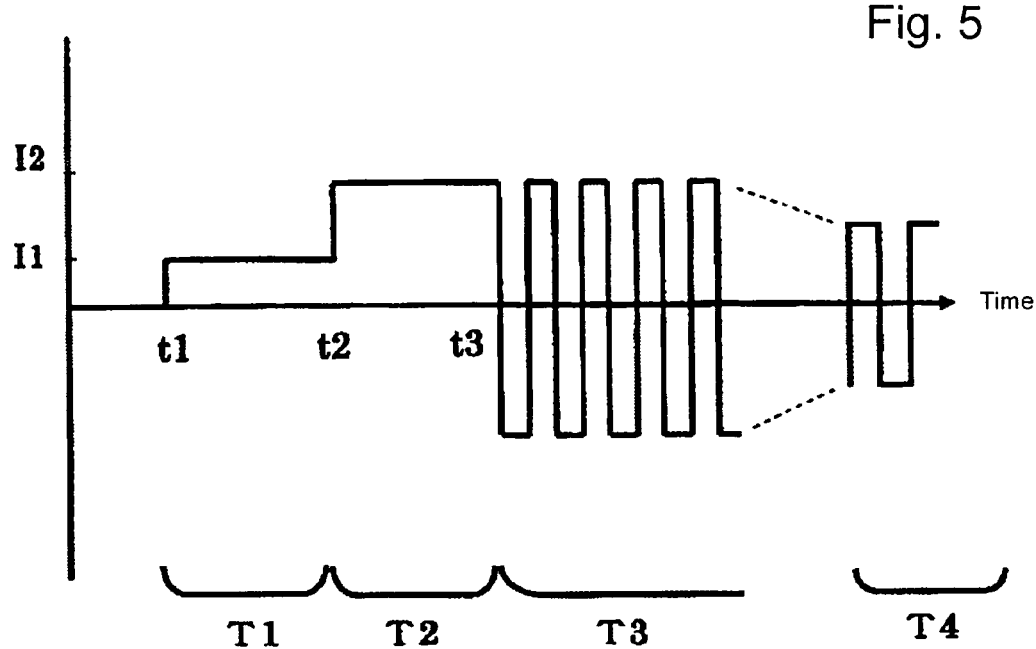
FIGS. 5 & 6 are plots of the current waveform of the discharge lamp in accordance with the invention during a cold start and a hot start, respectively.

FIG. 5 shows the waveform of the current which is supplied to the discharge lamp 10 by the feed device 20. The y axis plots the current value and the x axis plots the time in the representation.

When, at time t1, a dielectric breakdown of the discharge lamp occurs, and thus operation begins, a direct current I1 flows. The interval during which this direct current I1 flows is labeled T1.

At the time t2, the current value increases from I1 to I2. The interval during which this direct current I2 flows is labeled T2.

The direct current changes at the time t3 into an alternating current. The interval during which alternating current is supplied is labeled T3. The current value of the alternating current is changed by the constant wattage control over time. The state in which the discharge lamp is stable is a steady operating state which is an interval labeled T4. The term "rated current" is defined as the current value during the time T4. FIG. 5 shows the waveform of the current in the case of a cold start of the discharge lamp.

As was described above, the operation device according to the invention is characterized in that, during steady-state operation, alternating current is supplied, and when operation starts, direct current operation is carried out, and during direct current operation, a change from the state with a small current value (current value I1) to a state with a large current value (current value I2) takes place.

The reason for supplying direct current (I1) with a small current value at the start of operation is that the effect by contact of the discharge arc which forms from the back end of the coil with the inside of the discharge vessel can be reduced and also so that the starting position of the discharge arc can easily shift from the back end of the coil to the tip.

The reason why the direct current is made large afterwards is that upon switchover into the alternating current operation state, the other electrode becomes the electrode for electron emission (cathode) and that this electrode can only emit electrons with difficulty in an inadequately heated state. Therefore, to quickly increase the temperature of the two electrodes, the amount of current in the direct current operating state is increased.

In direct current operation, therefore in the state in which the arc start point is located on the back end of the coil and in which there is the possibility of contact of the discharge arc with the inside of the discharge vessel, the current value is made small in order to adequately reduce the effect by contact with the inside of the vessel. After a transition of the arc start point to the electrode tip, the current value is increased in order to quickly raise the electrode temperature with consideration of the impending transition into alternating current operation.

The numerical values are shown below by way of example.

The current value I1 is 0.3 to 0.6 times the rated current value. This is because: If the current value is less than this numerical value, discharge cannot be adequately maintained. If the current value is larger than this numerical value, an effect by contact with the inside of the vessel is exerted.

The current value I1 is more preferably 0.4 times to 0.5 times the rated current.

The supply duration T1 is 1 second to 15 seconds.

The current value I2 is 1.0 times to 2.0 times the rated current value. The reason for this is that, if the current value is less than this numerical value, the electrodes cannot be heated to an adequate degree. On the other hand, if the current value is larger than this numerical value, it is possible for the electrodes to overheat and to be deformed.

The current value I2 is more preferably 1.0 times to 1.5 times the rated current value.

The supply duration T2 is 2 seconds to 10 seconds.

1.0 times the rated current value means a case in which the current I2 is equal to the rated current. However, it is advantageous if it is preferably greater than 1.0 times, therefore is greater than the rated current.

Here, the term "rated current" means a lamp design-related medium current for steady-state operation of this discharge lamp, specifically an R.M.S. value. For example, in a 200 W lamp, it is 2.8 A.

The change of the current value I1 to I2, as shown in the drawings, is not limited to a single stage change, but can also take place in several stages or gradually. Alternating current operation takes place, for example, with frequency of 50 Hz to 400 Hz.

The operation of the feed device after starting of operation of the discharge lamp (direct current operation) until the transition into steady-state operation (alternating current operation) is described using FIG. 1.

In the discharge lamp 10, a dielectric breakdown, together with which a discharge current begins to flow and counting by operation of the timer 28 starts, takes place by generation of a high voltage pulse by the transformer TR.

The output of the timer 28 is sent to the full bridge driver circuit 21 and the signal selector 25. The full bridge driver circuit 21 fixes the polarity of the full bridge part 102 on one polarity until the timer 28 counts a given time (for example, 10 seconds). Furthermore, the signal selector 25 chooses the output of the comparator 24b. This means that during a given time starting from the beginning of discharge (for example, 10 seconds) the discharge lamp 10 is supplied with a direct current, and in doing so constant current control is carried out.

The output of the timer 28 is also output to the current setting device 27 which outputs reference current signals which change stepwise according to the output of the timer 28 for the times t1 to t3 according to FIG. 5. When a given time (10 seconds) is reached, the full bridge driver circuit 21 begins alternating current operation of the full bridge part 102.

Switching over by the signal selector 25 is carried out for example when the operation of the discharge lamp has stabilized. This timing can be stored independently of the above described given time in the timer 28. Starting at the beginning of operation, for example, a time of 30 seconds is set. By switching over the signal selector 25, a change from constant current control to constant wattage control takes place.

The state determination device 29 is a circuit for determining the state of the discharge lamp when operation starts.

Specifically, it assesses whether the discharge lamp 10 has a hot start or a cold start. The expression "hot start" means a state in which, after complete turn-off, only short time has passed until re-starting of operation. This is the state in which mercury remains vaporized in the discharge lamp and the lamp is extremely warm. On the other hand, the expression "cold start" means a state in which, after complete turn-off, sufficient time has passed for the mercury to no longer be vaporized in the discharge lamp, and for example, is present in liquid form, and in which the discharge lamp itself is adequately cooled. The expression "cold start" is an expression which has been defined appropriately compared to a hot start. However, this can also express the so-called normal state of the discharge lamp. The numerical values are shown by way of example below.

"Hot start" defines a state within roughly 45 seconds after immediate turn-off.

"Cold start defines the state in which at least 45 seconds have passed after immediate turn-off.

The state determination device 29 determines the voltage of the discharge lamp and thus assesses whether the state of the discharge lamp is "hot start" or "cold start". The output of the state determination device 29 is sent via the timer 28 to the current setting device 27 which, depending on the state of the discharge lamp, regulates the supply time of the direct current or the current value.

Voltage determination by the state determination device 29 is carried out after the rise of the current flowing in the lamp to I2 after dielectric breakdown of the discharge lamp, therefore during the interval T2. The reason for this that since, in a dielectric breakdown and immediately afterwards by release of the electric charge of the smoothing capacitor C2 and the like, a current which exceeds an allowable amount briefly flows temporarily, a determination which is relatively exact for an assessment of whether there is a hot start or a cold start is difficult.

In the drawings, the state determination device 29 determines the voltage of the discharge lamp. The method for assessment of whether the discharge lamp has a hot start or a cold start is, however, not limited to voltage determination but, for example, a method for assessment by counting the elapsed time after immediate shut-off, a method for determination of the temperature of the light emitting part of the discharge lamp when operation starts, and similar methods can be imagined.

Figure 6:
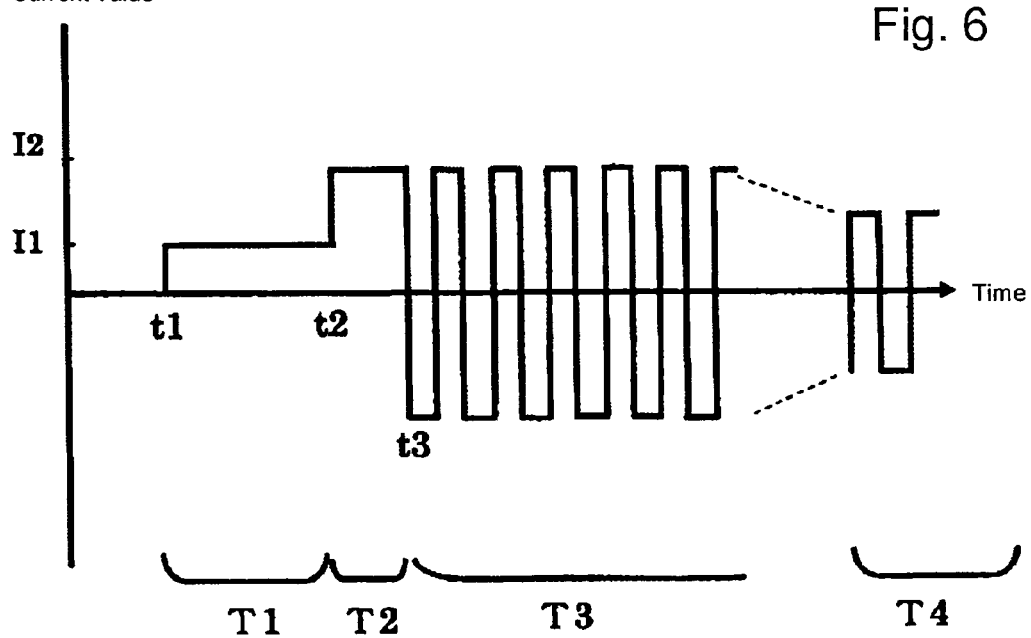

FIG. 6 shows the current waveform in the case of a hot start of the discharge lamp when the discharge starts. FIG. 6 can be compared to FIG. 5 which shows the current waveform in a cold start.

The current waveform shown in FIG. 6 differs from the current waveform shown in FIG. 5 in that the interval T2 during which the current I2 flows is shorter. The other waveforms are basically identical to one another. This means that the time is set shorter by the timer 28 when the state determination device 29 determines a hot start of the discharge lamp. Thus, the time of start of operation of the full bridge driver circuit 21 is moved nearer.

The reason for shortening the interval T2 in the case of a hot start is that the discharge lamp is already warm when operation starts, and therefore a setting in the same manner as in a cold start would cause an input wattage to occur which exceeds an allowable value, especially on one of the electrodes, and thus, the lamp is damaged.

Furthermore, instead of controlling the interval T2 by the two values, specifically whether hot or cold start of the discharge lamp, the state of the hot start can be classified more accurately and the interval T2 can be controlled more accurately according to this amount.

Furthermore, besides controlling the length of the time interval T2 in the case of a hot start and in the case of a cold start, the amount of current supplied during the interval T2 can be controlled. Specifically, the current value I2 during the interval T2 in the case of a hot start is fixed at a lower amount of current than the current value I2 in the case of a cold start.

Furthermore, in the case of a hot start and in the case of a cold start, both the length of the time interval T2 and also the amount of current of the current value I2 can be regulated.

It was described above that, in the case of a cold start, the current value I2 is 1.0 time to 2.0 times the rated current and the interval T2 is 2 seconds to 10 seconds. In a hot start both the control of the length of the time interval T2 and also the control of the amount of current of the current value I2 are set smaller than for the settings in a cold start, especially the interval T2 can be 0 under certain circumstances.

In control during a hot start, neither the length of the time interval T1 nor the amount of current of the current value I1 is controlled. The current value I1 of the interval T1 is set for suppressing the blackening of the tube wall by contact of the discharge arc with the inside of the discharge vessel at the start of operation, as was described above. Therefore, the reason for this is that, even in a hot start, a change of the setting value is not desirable.

Control based on the assessment of whether a hot or a cold start is described below by way of example using numerical values. In the discharge lamp, the rated wattage is 135 W and the rated current (for steady-state operation) is 1.9 A. The direct current I1 is set to 1 A and the direct current I2 is set to 2.6 A.

Starting at the instant at which the direct current reaches 2.6 A, after the dielectric breakdown of the discharge lamp, the lamp voltage is determined at the instant after 0.5 seconds have elapsed.

The assessment reference voltage which was set by the state determination device 29 is, for example, 18 V. The case in which the determination voltage is greater than or equal to 18 V is assessed as a hot start. The case in which it is less than 18 V is assessed as a cold start.

When the state determination device 29 has assessed the discharge lamp as a "hot start", a signal is sent to the timer 28 and the interval T2 during which the current value I2 (2.6 A) flows is set to 1 second. After 1 second elapses, switchover of the polarity of the full bridge part 102 by the full bridge driver circuit 21 begins, by which alternating current operation begins. If, in addition, once a given time (for example, roughly 20 seconds) has run, switchover to constant wattage control takes place by the signal selector 25.

On the other hand, in the case of assessment of a cold start by the state determination device 29, a signal is sent to the timer 28, the interval T2 during which the current value I2 (2.6 A) flows is fixed at five seconds, and after five seconds elapse, a polarity switchover of the full bridge part 102 by the full bridge driver circuit begins. In this way, alternating current operation begins, and moreover, after a given time has elapsed (for example, roughly 20 seconds) switchover to constant wattage control by the signal selector 25 takes place.

The numerical values of the discharge lamp are shown by way of example below.

The outside diameter of the light emitting part is in the range from 8 mm to 12 mm, for example, 9.4 mm;

the inside volume of the light emitting part is in the range from 50 mm$^3$ to 120 mm$^3$, for example, 85 mm$^3$; and The distance between the electrodes is in the range from 0.7 mm to 2 mm, for example, 1.0 mm.

The discharge lamp is operated with a rated wattage of 135 W and with rectangular waves of 150 Hz.

Furthermore, numerical values of the electrodes are shown by way of example below.

The diameter of the melt part 3 is 1.0 mm to 2.0 mm, for example, 1.4 mm;

the length in the axial direction of the melt part 3 is 0.7 mm to 2.0 mm, for example, 1.0 mm;

the diameter of the coil part 4 is 1.0 mm to 2.0 mm, for example, 1.3 mm;

the length of the coil part 4 is in the range from 1.0 mm to 2.0 mm, for example, 1.5 mm;

the diameter of the axis 5 is in the range from 0.2 mm to 0.6 mm, for example, 0.4 mm;

the length of the axis 5 is in the range from 5.0 mm to 10.0 mm, for example, 7.0 mm;

the wire diameter of the coil is in the range from 0.1 mm to 0.3 mm, for example, 0.25 mm;

the diameter of the projection 2 is 0.15 mm to 0.6 mm, for example, 0.3 mm; and the length in the axial direction of the projection 2 is 0.1 mm to 0.4 mm, for example, 0.25 mm.

The melt part with a larger diameter can be formed by the coil being melted by an arc discharge, laser light irradiation or the like using a welder. The beam diameter of the laser light is 0.2 mm to 0.7 mm, for example, 0.6 mm. The duration of irradiation is 0.2 seconds to 1.0 seconds, for example, 0.35 seconds. To prevent oxidation of the electrodes, it is advantageous that the laser irradiation takes place in an atmosphere of argon gas or the like.

Continuous laser light irradiation to form the melt part with a larger diameter can be carried out. However, pulsed irradiation can also be performed. The term "pulsed radiation" is defined in this case as repeated irradiation of a short duration (millisecond range) followed by a pause of a short duration (millisecond range). Pulsed irradiation is normally more effective than uninterrupted irradiation.

Furthermore, instead of irradiation with laser light, electron beams can also be used. The reason for this is since, in electron beams, the beam diameter can also be made small as in laser light, they are suited for melting a small coil in a controlled manner as in the invention.

Next, a test was conducted with respect to the instant at which the state determination device is to assess the state of the discharge lamp. This test was used to draw the conclusion that it should be assessed by the state determination device whether there is a hot or a cold start during the interval T2, not during the interval T1 during which the state determination device starts.

In the test the lamp specification was as follows:

The maximum outside diameter of the light emitting part is 9.4 mm;

the distance between the electrodes is 1.0 mm;

the inside volume of the arc tube is 85 mm ;

the rated wattage is 135 W;

the rated voltage is 70 V and the rated current is 1.9 A.

For the feed device, the rated wattage was 135 W, the rated voltage was 70 V and the rated current was 1.9 A.

First of all, before the test for a discharge lamp with the above described specification, the relation between the elapsed time after turning off and the temperature of the lower area of the light emitting part was measured.

As a result the following was confirmed:

For an elapsed time after turn-off of 30 seconds the temperature of the lower area of the light emitting part was 500° C.;

For an elapsed time after turn-off of 45 seconds, the temperature of the lower area of the light emitting part was 400° C.;

For an elapsed time after turn-off of 70 seconds, the temperature of the lower area of the light emitting part was 300° C.;

For an elapsed time after turn-off of 115 seconds, the temperature of the lower area of the light emitting part was 200° C.; and For an elapsed time after turn-off of 220 seconds, the temperature of the lower area of the light emitting part was 100° C.

Next, for the test of the above described feed device, a direct current I1 of 1 A was allowed to flow into the above described discharge lamp during the interval T1 of 5 seconds, during the interval T2 of 5 seconds, a direct current I2 of 2.6 A was allowed to flow, and afterwards, operation with 150 Hz using rectangular alternating current waves was carried out. This operating test was carried out for five discharge lamps with the above described specification (lamp 1, lamp 2, lamp 3, lamp 4, lamp 5).

Figure 7:
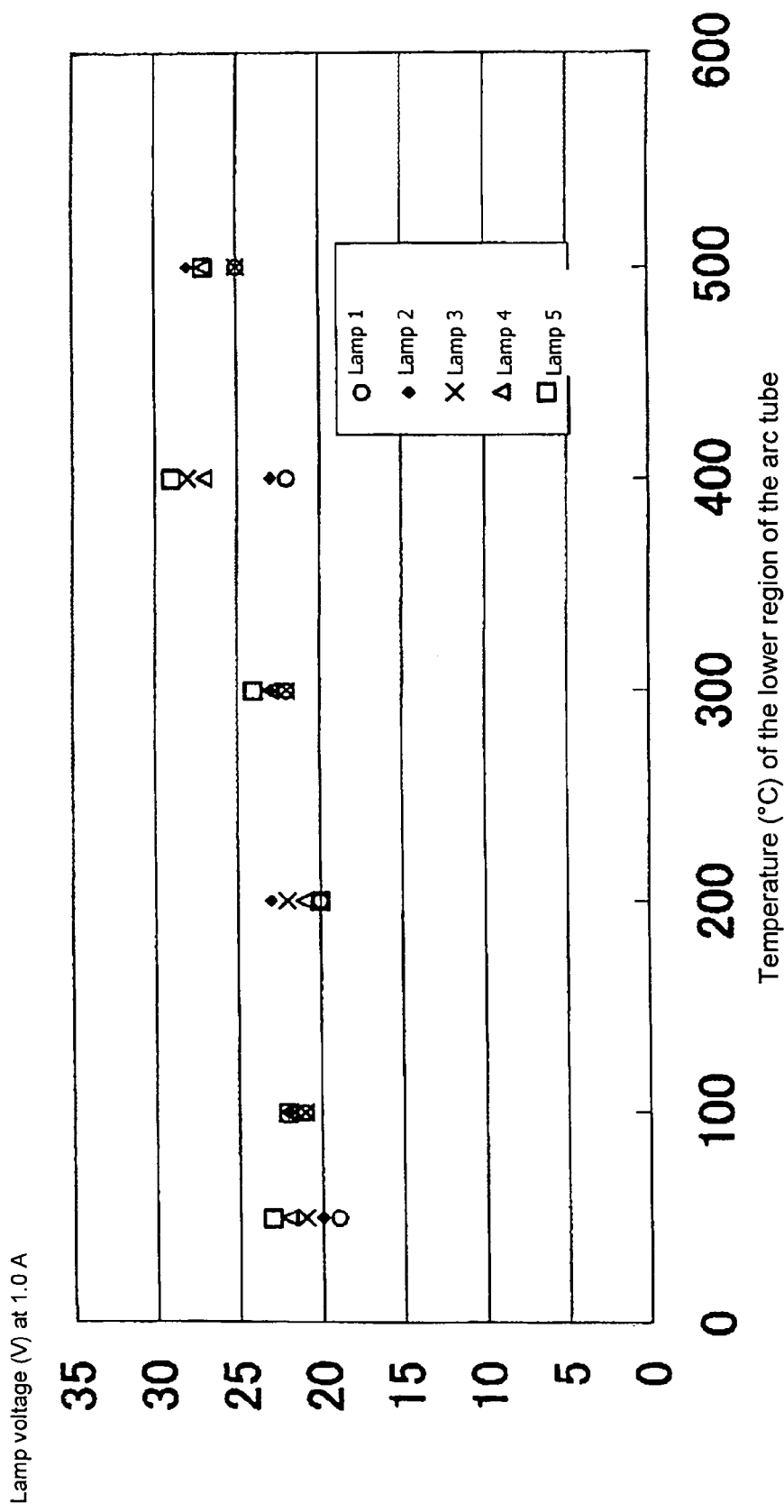
FIG. 7 & 8 show a schematic of the test results for the invention during the starting phase and the subsequent increased current phase, respectively.

FIG. 7 shows the result of measurements of the operating voltage of the discharge lamps by the state determination device during the interval T1. Here, the y axis plots the determined lamp voltage (V) and the x-axis plots the temperature ° C. of the lower area of the light emitting part directly before restart.

The test was carried out using five lamps by the lamps being operated, their temperature being increased to the saturation temperature, and afterwards, the lamps being turned off. The respective lamp was restarted each time at an elapsed time after turn-off at which the temperature of the lower area of the light emitting part of the respective lamp reached 50° C., 100° C., 200° C., 300° C., 400° C. and 500° C., and the lamp voltage was measured at a time at which the first half second of the interval T1 was reached. Specifically, the lamp 1 was turned off after operation, restarted at the temperature of the lower area of the light emitting part of 50° C. and the lamp voltage was measured. Next, the same lamp 1 was operated, likewise restarted at a temperature of the arc tube after turning off of 100° C., and the lamp voltage was measured. For the lamp 1, furthermore, the cases of 200° C., 300° C., 400° C. and 500° C. were measured. Afterwards, measurements were taken in the same way for the lamps 2, 3, 4 and 5.

Furthermore, the temperature of the lower area of the arc tube by the above described preceding test can be replaced by the elapsed time after immediate turn-off up to restart. This means that the following interpretation is possible:

the temperature of the lower area of the light emitting part of 100° C.=an elapsed time after turn-off of 220 seconds;

the temperature of the lower area of the light emitting part of 200° C.=an elapsed time after turn-off of 115 seconds;

the temperature of the lower area of the light emitting part of 300° C.=an elapsed time after turn-off of 70 seconds;

the temperature of the lower area of the light emitting part of 400° C.=an elapsed time after turn-off of 45 seconds;

the temperature of the lower area of the light emitting part of 500° C.=an elapsed time after turn-off of 30 seconds.

The lamp voltage can be measured using the elapsed time after turn-off.

The test result shown in FIG. 7 showed that a correlation is obtained in which the shorter the elapsed time after turn-off and the higher the temperature of the lower area of the arc tube, the higher the lamp voltage. However, a result could not be obtained which is relatively effective for assessing the temperature of the lower area of the arc tube and the lamp state, i.e., for assessing whether it is a hot start or a cold start.

This means that the state determination device 29 cannot determine the state of the discharge lamp during the interval T1.

The reason why, before the test, the relation between the elapsed time after turn-off and the temperature of the lower area of the light emitting part was confirmed beforehand by a preceding test is that measuring the temperature of the lower area of the arc tube after turn-off in a real test is difficult in practice. The reason for this difficulty is that, by producing a high voltage of the ignitor, by installing a sensor such as a thermocouple or the like, to measure the temperature of the lower area of the arc tube in the sensor circuit, the high voltage breaks through, and that, in this way, the measurement instrument is damaged or an adverse effect is exerted on the starting property.

Figure 8:
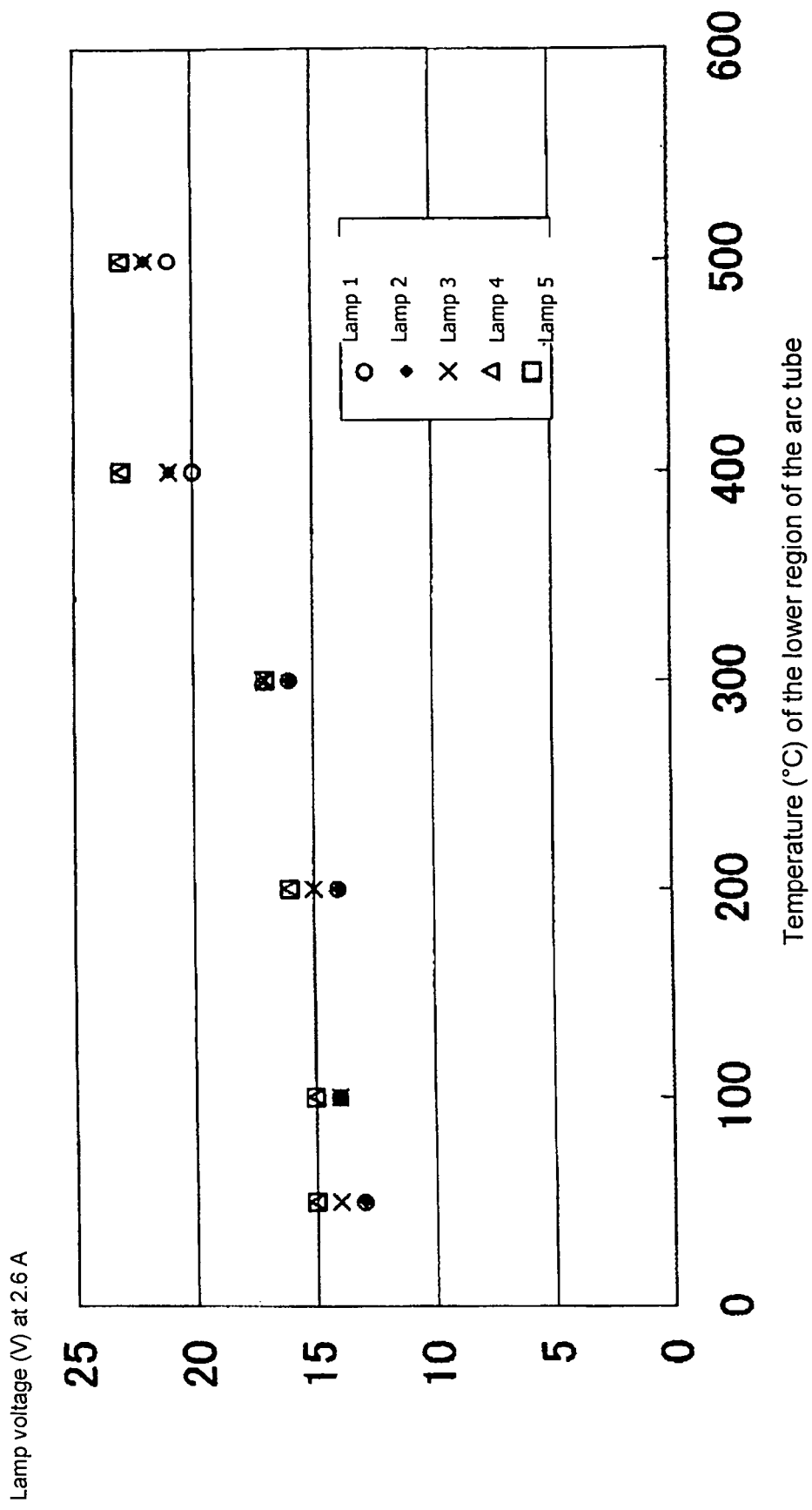

FIG. 8 shows the result of measurement of the operating voltage of the discharge lamp by the state determination device 29 during the interval T2. Here, the y axis plots the determined lamp voltage (V) and the x-axis plots the temperature (° C.) of the lower area of the light emitting part directly before restart.

The test was carried out in the same way as in the case as shown in FIG. 7 using five lamps. The lamps were operated, their temperature was increased to the saturation temperature, and afterwards the lamps were turned off. The respective lamp was restarted at an elapsed time after turn-off at which the temperature of the lower area of the light emitting part of the respective lamp reached 50° C., 100° C., 200° C., 300° C., 400° C. and 500° C., and the lamp voltage was measured at a time at which the first half second of the interval T2 was reached.

Furthermore, the temperature of the lower area of the arc tube in the above described preceding test can be replaced by the elapsed time after immediate turn-off to restart.

The test result shown in FIG. 8 indicates that, between the case of an elapsed time after turn-off within 45 seconds (in the case of a temperature of the lower area of the arc tube of 400° C. and 500° C.) and a case of an elapsed time of at least 70 seconds (in the case of a temperature of the lower area of the arc tube of 50° C., 100° C., 200° C., 300° C.), a clear difference of the lamp voltage arose. This means that the first lamp voltage is roughly 20 V to 23 V, while the last lamp voltage is roughly 13 V to 17 V. Therefore, based on the lamp voltage, the two states can be determined, the former case being regarded as a hot start and the latter case as a cold start.

This means that the state determination device during the interval T2 can determine the state of the discharge lamp.

It can be derived from the above described test result that it is advantageous to differentiate between a hot start and a cold start of the state of the discharge lamp by a measurement during the interval T2 during which a higher direct current is supplied than the rated current.

It does seem that the above described test is derived under certain conditions (lamp specification, specification of the feed device) and that therefore a generalization based solely on this test result is not appropriate. The discharge lamp which is used as a projector device or as its light source should however be limited essentially to a certain range in its size and the specification required of it. It can be stated that the same action and the same effect are obtained when they have the ranges of lamp specifications described in paragraphs [0088] and [0090].

The device according to the invention for operating a discharge lamp has some prerequisites. Only by satisfying these prerequisites can the action and the effect of the invention develop.

First, a discharge lamp is assumed in which, during steady-state operation, alternating current operation is carried out, and when starting operation, direct current operation is carried out. The reason for this is that, in a discharge lamp of this operating type, when switching over from direct current operation to alternating current operation, the disadvantage of lamp extinction as a result of low electrode temperature arises.

Even if a process for control in which, when operation starts the current value is changed, for a discharge lamp which is operated in steady-state operation using a direct current is the prior art, this circumstance is therefore different than in the invention in the sense of the technical object.

Secondly, in the discharge lamp according to the invention, a discharge lamp of the short arc type is assumed, in which the distance between the electrodes is at most 2 mm and in which the light emitting part is filled with at least 0.15 mg/mm$^3$ of mercury, a rare gas and a halogen in an amount in the range of from $1 \times 10^{-6}$ μmole/mm$^3$ to $1 \times 10^{-2}$ μmole/mm$^3$. The reason for this is the following:

In a discharge lamp with this arrangement, the silicon oxide which has been released from the inside of the discharge vessel is split into Si and O in the discharge plasma. The oxygen (O) in the discharge space and the tungsten of the electrodes react with one another, by which tungsten oxide is produced. The transport of the tungsten from the electrodes to the inside of the discharge vessel becomes unduly large. The oxygen (O) at a suitable amount acts like the halogen cycle and suppresses the transport of the tungsten (W) to the inside wall of the discharge vessel. In the case of a large amount of oxygen, as in the discharge lamp according to the invention, in the discharge space, the tungsten oxide (WO$_x$) increases, by which an unduly large amount of tungsten oxide is transported to the inside wall of the discharge vessel.

Third, a discharge lamp with an electrode arrangement (the arrangement shown in FIG. 2) is assumed in which a coil is melted on the rod of the electrode. In this discharge lamp, when operation starts, on the back end of the coil part, a discharge starting point is formed, by which the disadvantage of collision and contact of the arc with the inside wall of the discharge vessel occur. These disadvantages arise to a considerable degree in the case in which the minimum distance between the coil part and the inside of the discharge vessel (distance L in FIG. 3) is small. Because the minimum distance L is small, a collision and contact of the arc with the inside of the discharge vessel occur by the arc starting point which has formed on the back end of the coil part. Specifically, the minimum distance L is at most 2.0 mm. The disadvantages arise to a special degree at distances of at most 1.5 mm and 1.0 mm.

In a discharge lamp with a large distance L, therefore, the phenomenon of collision and contact of the discharge arc with the inside of the discharge vessel hardly occurs if the back end of the coil part acts as a starting point. This means that, here, the technical object of the subject matter of the invention is not actually present, in which control is carried out by which the direct current during starting of operation is changed from the state with a small current value (current value I1) into the state with a large current value (current value I2).

In a discharge lamp without this arrangement and with a completely different application, therefore the arrangement in which the electrode is wound with a coil may be conventionally known. In this discharge lamp, however, originally the phenomenon of collision and contact of the arc with the inside of the discharge vessel does not occur. Therefore, the aforementioned technical object is not present. It can therefore be stated that this prior art has a dimension which is completely different from the invention.

In the discharge lamp according to the invention, the electrode tip is provided with a projection by which the temperature of the electrode tip in the transition of direct current operation at the beginning of start-up into alternating current operation can be rapidly increased, by which the arc discharge can be quickly stabilized. Furthermore, in the case of a discharge lamp of the short arc type in which the light emitting part is filled with at least 0.15 mg/mm$^3$ of mercury, a rare gas and from $1 \times 10^{-6}$ µmole/mm$^3$ to $1 \times 10^{-2}$ µmole/mm$^3$ of a halogen, it becomes possible to regulate the distance between the electrodes to an optimum value by self-regulating expansion and contraction of this projection.

The projection can be formed beforehand using the electrode rod, and thus, the direction of self-regulating expansion and contraction can be controlled beforehand. However, it is also possible to not form the projection in the production of the discharge lamp, but to form it proceeding from a so-called zero state in the course of lamp operation.

When the electrode tip is provided with a projection, it is possible that, in the case of a hot start, this projection is worn off. However, with the invention, also with consideration of this circumstance, the direct current I2 during the interval T2 is limited, by which both the wear and also deformation of the projection can be suppressed.

It is desirable for the electrode to be made of tungsten with a purity of at least 99.9999%. This is because, in the case of emission of the impurities contained in the electrodes into the discharge space, devitrification and blackening of the discharge vessel are caused.

Figure 9:
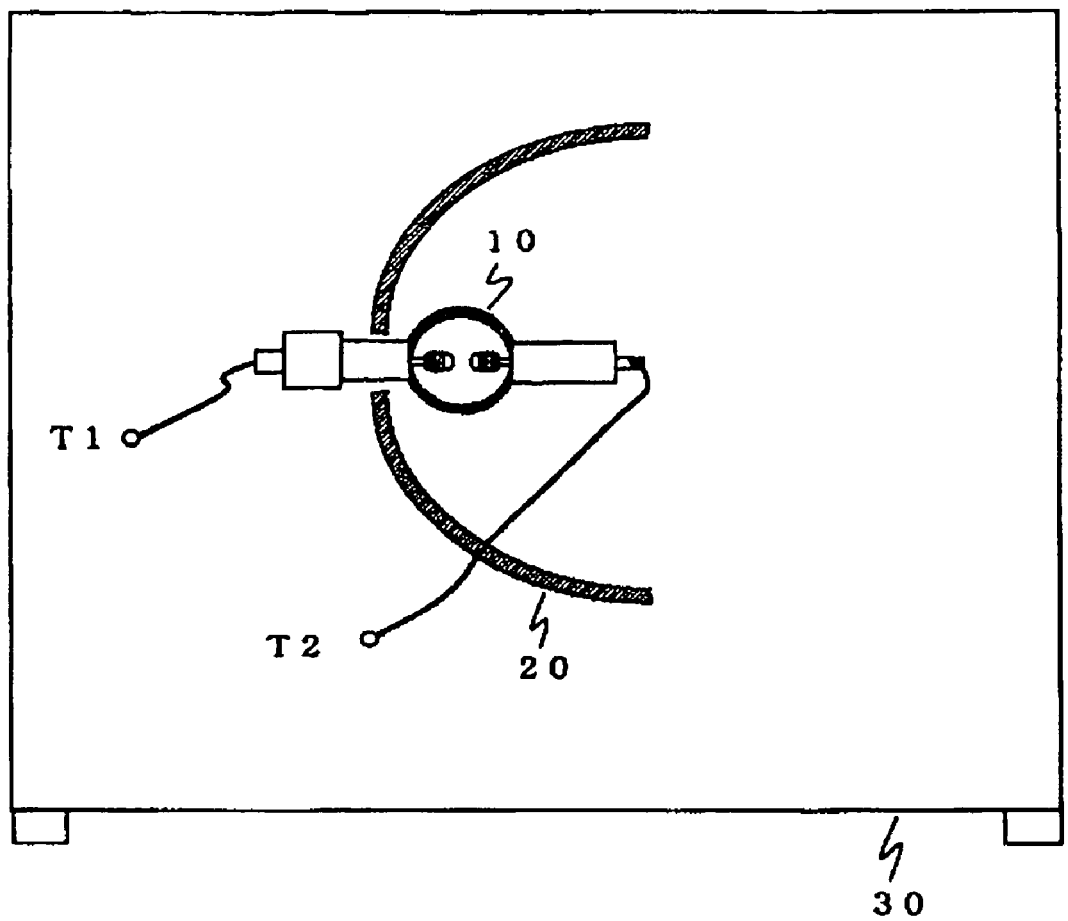
FIG. 9 is a schematic representation of a light source device using a discharge lamp in accordance with the invention.

FIG. 9 shows the state in which the discharge lamp 10 is surrounded by a concave reflector 20, and a combination of them (hereinafter a combination of the discharge lamp 10 with the concave reflector 20 is called a "light source device") are installed in a projector device 30. The projector device 30 is, in reality, densely composed of complicated optical components, electrical components and the like, but it is shown simplified in FIG. 9 for purposes of description.

The discharge lamp 10 is held securely through the hole of the concave reflector 20. A feed device which (not shown) is connected to the terminals T1, T2 of the discharge lamp 10. An elliptical reflector or a parabolic reflector is used as a concave reflector 20. On the reflection surface, a film which reflects light with a given wavelength is formed by vapor deposition.

The focal position of the concave reflector 20 is constructed at the arc position of the discharge lamp 10. Thus, the light at the arc starting point can be reflected by the reflector with high efficiency. Furthermore, a transparent glass which closes the front opening can be attached to the concave reflector 20.

As was described above, the device according to the invention for operating a discharge lamp which comprises the following:

a discharge lamp of the short arc type in which in a silica glass arc tube containing at least 0.15 mg/mm$^3$ of mercury, a rare gas and a halogen in an amount in the range of from $1 \times 10^{-6}$ µmole/mm$^3$ to $1 \times 10^{-2}$ µmole/mm$^3$, and a pair of opposed electrodes spaced at a distance of at most 2 mm; and a feed device which supplies a direct current to the discharge lamp when operation starts and afterwards an alternating current, at least one of the electrodes having a coil part which was obtained by winding the rod of the electrode with a coil, and a melt part which is formed by melting the front end portion of the coil, the coil part adjoining the melt part, is characterized in that the feed device supplies a direct current which is smaller than the rated current to the discharge lamp at the start of operation, and afterwards supplies a direct current which is at least as large as the rated current, and there is a means for ascertaining whether the discharge lamp, at the start of operation, is in a hot start or a cold start operating state, and which establishes at least one of the following parameters according to the ascertained operating state:

the value of the direct current which is at least as great as the rated current;

the feed duration of this direct current.

By starting with the use of a direct current at the beginning of operation, an unstable discharge state during starting and the corresponding lamp extinction can be advantageously prevented.

Furthermore, when starting with the use of a direct current at the beginning, a current which is less than the rated current is supplied, and afterwards, by increasing the current value, a current is supplied which corresponds at least to the rated current, the effect by contact of the discharge arc which forms on the back end of the coil with the inside of the discharge vessel can be reduced, and moreover, by increasing the temperature of the electrodes, the transition into alternating current operation can be advantageously carried out.

Additionally, by the measure that it is assessed whether the discharge lamp, when starting, has a hot or a cold start and direct current is regulated, in a hot start, an input wattage to the electrodes which exceeds the allowable value can be suppressed, and thus, melting and deformation of the electrodes can be prevented.

We claim:

1. Device for operating a discharge lamp, comprising:

a discharge lamp of the short arc type having a silica glass arc tube containing at least 0.15 mg/mm$^3$ of mercury, a rare gas and a halogen in an amount in the range of from $1 \times 10^{-6}$ µmole/mm$^3$ to $1 \times 10^{-2}$ µmole/mm$^3$, and a pair of opposed electrodes spaced at a distance of at most 2 mm;

a feed device which supplies a direct current to the discharge lamp when operation starts and afterwards supplies an alternating current; and control means for ascertaining whether the discharge lamp is in a hot or cold start operating state at the start of lamp operation;

wherein at least one of the electrodes has a coil part wound about a rod of the electrode and a melt part formed of a melted front end portion of the coil, the coil part adjoining the melt part, wherein, at the start of operation, the feed device is adapted to supply a direct current to the discharge lamp that is smaller than the rated current and to subsequently increase the direct current to at least the rated current, and wherein the control means establishes a value for at least one of the following parameters according to the ascertained hot or cold start operating state:

the value of the direct current which is at least as great as the rated current;

the feed duration of the direct current which is at least as great as the rated current.

2. Device for operation of a discharge lamp of the short arc type according to claim 1, wherein the value of the at least one of the parameters of the direct current which is at least as large as the rated current, and of the feed duration of the direct current which is at least as large as the rated current, in the case of a hot start operating state, is established by the control means to be less than is established in the case of a cold start operating state of the discharge lamp.

3. Device for operation of a discharge lamp of the short arc type according to claim 1, wherein the direct current which is smaller than the rated current is 0.3 to 0.6 times the rated current.

4. Device for operation of a discharge lamp of the short arc type according to claim 1, wherein the direct current which is smaller than the rated current is 0.4 to 0.5 times the rated current.

5. Device for operation of a discharge lamp of the short arc type according to claim 1, wherein the direct current which corresponds to at least the rated current is 1.0 to 2.0 times the rated current in the case of a cold start of the discharge lamp.

6. Device for operation of a discharge lamp of the short arc type according to claim 1, wherein the direct current which corresponds to at least the rated current is 1.0 to 1.5 times the rated current in the case of a cold start of the discharge lamp.

7. Device for operation of a discharge lamp of the short arc type according to claim 1, wherein the direct current which is smaller than the rated current is supplied for a time duration of from 1 to 15 seconds.

8. Device for operation of a discharge lamp of the short arc type according to claim 1, wherein the direct current which corresponds to at least the rated current is supplied in the case of a cold start of the discharge lamp for a time duration of from 2 to 10 seconds.

9. Device for operation of a discharge lamp of the short arc type according to claim 1, wherein said control means comprises means for determining the hot or cold operating state of the lamp by measurement of one of the following parameters:

voltage of the lamp, time from turning off the lamp to restart of operation, temperature of the light emitting part of the lamp bulb.

10. Device for operation of a discharge lamp of the short arc type according to claim 1, wherein said control means comprises means for determining the cold operating state of the lamp by the mercury in the discharge lamp being an at least partially condensed form.

11. Device for operation of a discharge lamp of the short arc type according to claim 1, wherein said control means comprises means for determining the hot operating state of the lamp by the mercury in the discharge lamp being in a completely vaporized form.

12. Device for operation of a discharge lamp of the short arc type according to claim 1, wherein said control means is adapted for establishing the hot start operating state of the discharge lamp by the time between turning off and restarting of the discharge lamp being less than 45 seconds.

13. Device for operation of a discharge lamp of the short arc type according to claim 1, wherein the cold start operating state of the discharge lamp is established as the state in which the time between turning off the discharge lamp and its restart is at least 45 seconds.

14. Device for operation of a discharge lamp of the short arc type according to claim 1, wherein the feed device is adapted to supply said alternating current to the discharge lamp at a constant wattage.

15. Device for operation of a discharge lamp of the short arc type according to claim 1, wherein the electrode with the coil part and melt part has a projection on a tip thereof.

16. Device for operation of a discharge lamp of the short arc type according to claim 1, wherein said control means is adapted for determining whether the discharge lamp is in a hot or cold start operating state at the start of lamp operation during the feed duration of the direct current which is at least as great as the rated current.

17. Device for operation of a discharge lamp of the short arc type according to claim 3, wherein the direct current which corresponds to at least the rated current is 1.0 to 2.0 times the rated current in the case of a cold start of the discharge lamp.

18. Device for operation of a discharge lamp of the short arc type according to claim 17, wherein the direct current which is smaller than the rated current is supplied for a time duration of from 1 to 15 seconds.

19. Device for operation of a discharge lamp of the short arc type according to claim 18, wherein said control means comprises means for determining the hot or cold operating state of the lamp by measurement of one of the following parameters:

voltage of the lamp, time from turning off the lamp to restart of operation, temperature of the light emitting part of the lamp bulb.

20. Device for operation of a discharge lamp of the short arc type according to claim 19, wherein said control means is adapted for establishing the hot start operating state of the discharge lamp by the time between turning off and restarting of the discharge lamp being less than 45 seconds.

* * * * *